US012608330B2

(12) United States Patent
Pawar et al.

(10) Patent No.: US 12,608,330 B2
(45) Date of Patent: Apr. 21, 2026

(54) INDIVIDUAL POWER CYCLE CONTROL OF ACCELERATOR MODULES CONFIGURED ON A NODE

(71) Applicant: MICROSOFT TECHNOLOGY LICENSING, LLC, Redmond, WA (US)

(72) Inventors: Sagar Chandrakan Pawar, Bangalore (IN); Kai Li, Bellevue, WA (US); Karunakara Kotary, Redmond, WA (US); Santosh Srinivas Rao Deshpande, Bangalore (IN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 133 days.

(21) Appl. No.: 18/540,113

(22) Filed: Dec. 14, 2023

(65) Prior Publication Data
US 2025/0199984 A1      Jun. 19, 2025

(51) Int. Cl.
*G06F 13/40*        (2006.01)
*G06F 11/07*        (2006.01)
*G06F 13/42*        (2006.01)
(52) U.S. Cl.
CPC ...... *G06F 13/4068* (2013.01); *G06F 13/4022* (2013.01); *G06F 13/4282* (2013.01); *G06F 2213/0026* (2013.01)
(58) Field of Classification Search
CPC ............. G06F 13/4068; G06F 13/4022; G06F 13/4282; G06F 2213/0026

USPC .............. 710/3, 8, 15, 19, 62, 104, 110, 306
See application file for complete search history.

(56) References Cited

U.S. PATENT DOCUMENTS

| | | | | | |
|---|---|---|---|---|---|
| 10,049,065 | B2 * | 8/2018 | Ham | ...................... | G06F 13/362 |
| 10,949,321 | B1 * | 3/2021 | Volpe | .................. | G06F 11/0793 |
| 2008/0126597 | A1 * | 5/2008 | Hirai | ..................... | G06F 13/409 |
| | | | | | 710/19 |
| 2010/0064164 | A1 * | 3/2010 | Benhase | ............. | G06F 11/0727 |
| | | | | | 714/E11.085 |
| 2012/0076319 | A1 * | 3/2012 | Terwal | .................. | H04L 7/0008 |
| | | | | | 381/86 |
| 2013/0106502 | A1 * | 5/2013 | Dohm | .................. | G06F 1/3206 |
| | | | | | 327/544 |

(Continued)

OTHER PUBLICATIONS

International Search Report and Written Opinion received for PCT Application No. PCT/US2024/055300, Feb. 24, 2025, 13 pages.

*Primary Examiner* — Farley Abad
*Assistant Examiner* — Henry W Yu
(74) *Attorney, Agent, or Firm* — Newport IP, LLC; Jacob P. Rohwer

(57) ABSTRACT

Disclosed herein is a system for implementing a management controller on a node, or network server, that is dedicated to monitoring the individual health of a plurality of accelerator modules configured on the node. Based on the monitored health, the management controller is configured to implement autonomous power cycle control of individual accelerator modules. The autonomous power cycle control is implemented without violating the requirements of standards established for accelerator modules (e.g., OPEN COMPUTE PROJECT requirements, PERIPHERAL COMPONENT INTERCONNECT EXPRESS (PCIe) interface requirements).

20 Claims, 6 Drawing Sheets

(56) References Cited

U.S. PATENT DOCUMENTS

| | | | |
|---|---|---|---|
| 2014/0195704 A1* | 7/2014 | Bhatia | G06F 11/3055 |
| | | | 710/105 |
| 2015/0365269 A1* | 12/2015 | Hsieh | H04L 41/12 |
| | | | 709/224 |
| 2017/0364375 A1 | 12/2017 | Ku | |
| 2022/0158865 A1* | 5/2022 | Thomaiyar | H04L 12/40039 |
| 2022/0171672 A1* | 6/2022 | Mitra | G06F 13/28 |

* cited by examiner

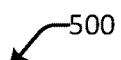

RECEIVE A FIRST SIGNAL THAT IDENTIFIES AN INDIVIDUAL ACCELERATOR MODULE OF A PLURALITY OF ACCELERATOR MODULES CONFIGURED ON A NODE
502

DETERMINE THAT THE FIRST SIGNAL INDICATES AN ERROR IMPACTING THE INDIVIDUAL ACCELERATOR MODULE
504

IN RESPONSE TO DETERMINING THAT THE FIRST SIGNAL INDICATES THE ERROR IMPACTING THE INDIVIDUAL ACCELERATOR MODULE, SEND A SECOND SIGNAL TO POWER CYCLE THE INDIVIDUAL ACCELERATOR MODULE WITHOUT POWER CYCLING OTHER ACCELERATOR MODULES OF THE PLURALITY OF ACCELERATOR MODULES
506

INSTRUCT A GENERAL-PURPOSE INPUT-OUTPUT EXPANDER TO GENERATE AND SEND AN ASYNCHRONOUS POWER CYCLE SIGNAL TO THE INDIVIDUAL ACCELERATOR MODULE, AND NOT THE OTHER ACCELERATOR MODULES, VIA A SWITCHED OR GATE OF A MULTIPLEXER/DEMULTIPLEXER
508

FIG. 5

INDIVIDUAL POWER CYCLE CONTROL OF ACCELERATOR MODULES CONFIGURED ON A NODE

BACKGROUND

Many different types of physical computing devices, such as network servers, are configured with multiple central processing units (CPUs), alternatively referred to as processing cores. A physical device, such as a network server, is referred to herein as a node. To enhance the performance of applications and/or virtual resources (e.g., virtual machines, containers) on a node, a CPU may be associated with multiple accelerator modules, alternatively referred to as co-processors. Examples of an accelerator module include a graphics processing unit (GPU) and a networking accelerator.

Unfortunately, when an individual accelerator module encounters an error, standardized approaches to address the error require the entire node to be power cycled. For example, when an individual accelerator module configured in accordance with the OPEN COMPUTE PROJECT (e.g., an OPEN COMPUTE PROJECT ACCELERATOR MODULE (OAM)) enters a kernel panic or hang state, a power cycle event such as a reboot is required for the entire node by powering the node down and powering the node back up via an alternating current (AC) cycle to initiate the reboot sequence. The OPEN COMPUTE PROJECT is an organization in which different manufacturers and/or suppliers collaborate and share technology related to accelerator modules for compatibility and scaling purposes.

In another example, accelerator modules that are connected via the PERIPHERAL COMPONENT INTERCONNECT EXPRESS (PCIe) interface, are not allowed to implement power cycle events (e.g., functional-level reboots, resets) in accordance with the standard. Therefore, when an individual accelerator module connected via the PCIe interface enters a kernel panic or hang state, a power cycle event such as a reboot is required for the entire node by powering the node down and powering the node back up to initiate the reboot sequence. Stated alternatively, the accelerator module that is impacted by the error is not hot swappable (i.e., the node is unable to power cycle only the impacted accelerator module).

A power cycle event of an entire node can take upwards of thirty minutes to complete. During this time, all of the CPUs and/or accelerator modules configured on the node, even the ones that are not impacted by the error, are not able to execute applications and/or virtual resources that belong to cloud tenants and/or cloud administration processes. Rather, this time is spent disconnecting the power to the node, waiting a few minutes for the hardware components of the node to cool down, reconnecting the power to the node, implementing a reboot sequence for the operating system, and then implementing reboot sequences for the CPUs and accelerator modules that were previously executing the applications and/or virtual resources that were interrupted when the power was disconnected.

Power cycling the entire node has a negative affect on the applications and/or virtual resources executing on accelerator modules that were not impacted by the error. Consequently, instead of one cloud tenant (e.g., customer) being affected by the error, multiple cloud tenants are typically affected by the error, thereby increasing the Annual Interruption Rate (AIR). AIR is a metric that is tracked very closely by cloud platforms and tenants of cloud platforms for quality and service purposes. For instance, an increasing AIR generally translates to lost earnings due to longer down times, longer debug cycles, unavailable virtual machines, etc.

SUMMARY

The techniques disclosed herein introduce a management controller on a node, or network server, that is dedicated to monitoring the individual health of a plurality of accelerator modules configured on the node. Based on the monitored health, the management controller is configured to implement autonomous power cycle control of individual accelerator modules. The autonomous power cycle control is implemented without violating the requirements of standards established for accelerator modules (e.g., OPEN COMPUTE PROJECT requirements, PERIPHERAL COMPONENT INTERCONNECT EXPRESS (PCIe) interface requirements).

Because the management controller is dedicated to monitoring accelerator modules, the management controller may be referred to as an Accelerator Management Controller (AMC). The management controller, or AMC, may be implemented via a Baseboard Management Controller (BMC), a discrete module, or other types of management modules. For instance, a BMC is a service processor that is capable of monitoring the physical state of the device memory and other hardware/firmware components (e.g., accelerator modules such as graphics processing units (GPUs) or networking accelerators) using sensors and/or other mechanisms. The BMC is configured on a printed circuit board of a node (e.g., a Universal Baseboard, a Motherboard) and can implement communications associated with the monitoring via a shared or a dedicated network interface card (NIC).

To this end, the management controller described herein is configured to receive signals indicative of the health of individual accelerator modules configured on the node. The management controller is configured to determine that a signal indicates an error impacting an identifiable accelerator module. In response to determining that the signal indicates the error impacting the identifiable accelerator module, the management controller is configured to send a signal to power cycle (e.g., reboot, reset) the identifiable accelerator module without power cycling other accelerator modules configured on the same node.

As described above, the error can be associated with a kernel panic or hang state, which can be caused by extreme thermal temperature conditions of the accelerator module and/or non-functional voltage regulation of the accelerator module. As additional examples, the error can be associated with hangs detected by a watchdog timer via periodic interrupt misses. The accelerator module can indicate an error state to the management controller by generating and sending a signal via the toggling of a General-Purpose Input-Output (GPIO) pin that that is dedicated to error signaling. Moreover, the signal identifies the accelerator module impacted by the error. Alternatively, the accelerator module can indicate an error state over a serial mechanism, an in band mechanism, or an out of band mechanism available to the accelerator module and the management controller.

For example, the signal "ERR_INT_N_#", where the "#" identifies the accelerator module, originates at a dedicated GPIO pin and can be communicated from the accelerator module to the management controller via an I2C bus. In another example, the signal "ERR_INT_N_#" originates at the dedicated GPIO pin and can be communicated from the accelerator module to the management controller via a system management bus (SMBUS).

As described above, the management controller is configured to set the configuration for autonomous decision making for power cycling the accelerator module impacted by the error based on the received signal. More specifically, the management controller sends a power cycle signal to the accelerator module that signaled the error via the I2C bus. For example, the management controller can send a synchronous autonomous power cycle signal to a GPIO expander configured on the I2C bus. The synchronous autonomous power cycle signal appears the same as the conventional "PERESET_N" signal used to power cycle the entire node, including all the accelerator modules on the node, in accordance with PCIe requirements. However, instead of power cycling all the accelerator modules based on the synchronous autonomous power cycle signal, the management controller instructs the GPIO expander to use the switching mechanisms of a multiplexer/demultiplexer (e.g., OR gates associated with the accelerator modules) to generate and send an asynchronous power cycle signal only to the accelerator module impacted by the error. In other words, the asynchronous power cycle signal is not sent to the other accelerator modules that are not impacted by the error. The asynchronous power cycle signal may be captured by "AUTON_POWER_CYCLE_#", where the #identifies the accelerator module that needs to be power cycled.

Consequently, via the use of the switching mechanisms of the multiplexer/demultiplexer (e.g., OR gates associated with the accelerator modules), the management controller can control the power supply to all the accelerator modules configured on a node on a per accelerator module basis and without disconnecting power to the entire node. That is, the asynchronous power cycle signal causes a power supply to the individual accelerator module to be disconnected and then reconnected after a short period of time, without disconnecting power to the other accelerator modules or the node.

In various examples, before initiating the power cycling described above, the management controller may initiate communications, over the system management bus, with the accelerator module that signaled the error to confirm that the accelerator module is in fact in an error state (e.g., kernel panic or hang state).

In various examples, the management controller is configured to notify, via emulating an attention button press over the system management bus, the operating system and/or other accelerator modules not impacted by the error that a hot swap flow for the accelerator module impacted by the error is being performed. This notification identifies the accelerator module impacted by the error and ensures that the operating system, CPUs, and/or other accelerator modules not impacted by the error do not send traffic or interact with the accelerator module impacted by the error.

Accordingly, via the use of the management controller described herein, accelerator modules that are not impacted by an error continue to function normally and seamlessly. In turn, the effect of the error on applications and/or virtual resources is limited to one or a small number of cloud tenants (i.e., the error does not affect all the cloud tenants executing applications and/or virtual resources on the node). Consequently, the productivity associated with the node, or a cluster of nodes to which the node belongs, remains at an acceptable level and the Annual Interruption Rate (AIR) remains low.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 5 illustrates an example flow diagram of an example method for monitoring a health of an individual accelerator module of a plurality of accelerator modules configured on a node.

DETAILED DESCRIPTION

The following Detailed Description discloses techniques and technologies for implementing a management controller on a node, or network server, that is dedicated to monitoring the individual health of a plurality of accelerator modules configured on the node. Based on the monitored health, the management controller sets the decision-making configuration for implementing autonomous power cycle control of individual accelerator modules. The autonomous power cycle control is implemented without violating the requirements of standards established for accelerator modules (e.g., OPEN COMPUTE PROJECT requirements, PERIPHERAL COMPONENT INTERCONNECT EXPRESS (PCIe) interface requirements). Various examples, scenarios, and aspects are described below with reference to FIGS. 1-6.

Figure 1:
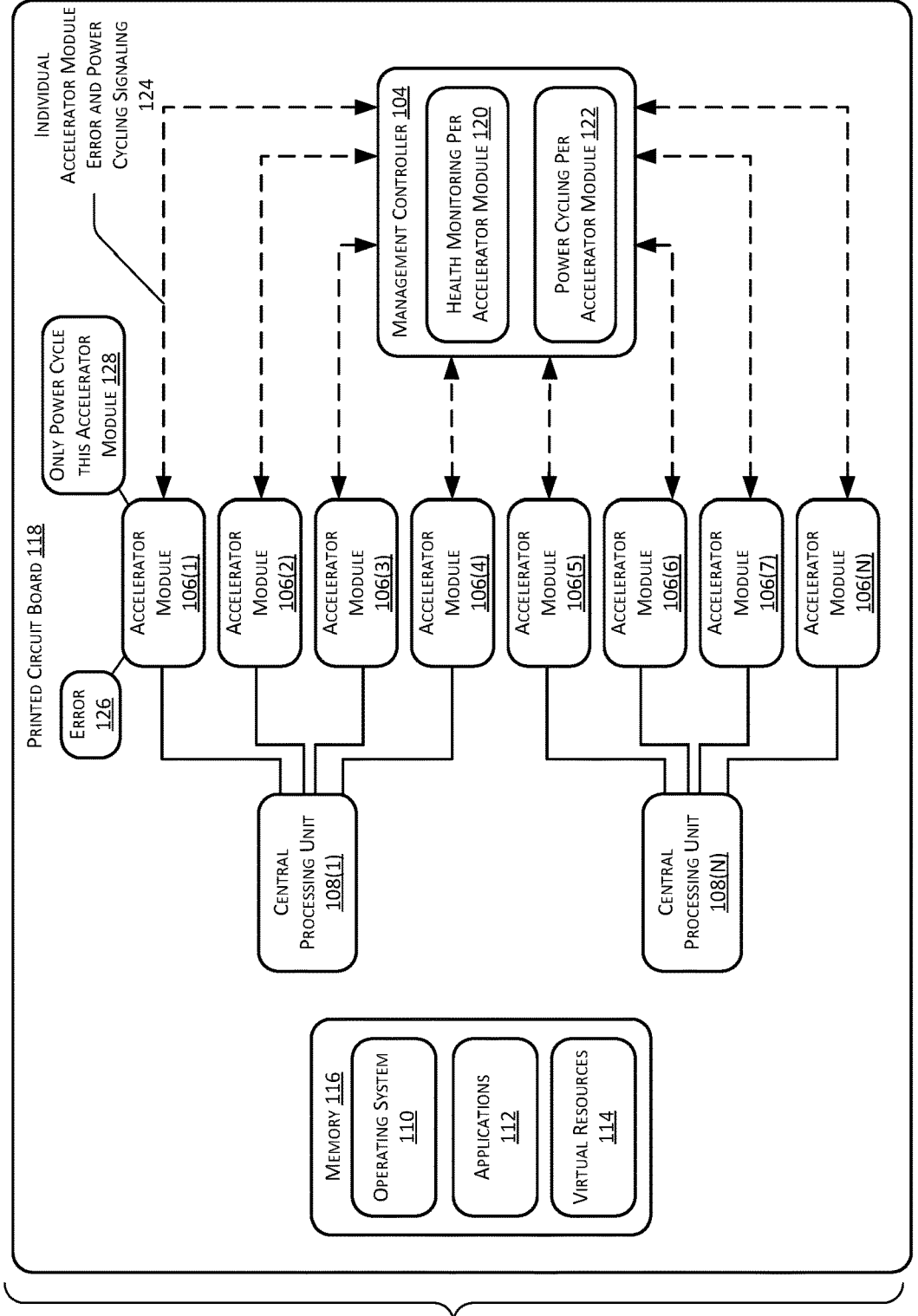
FIG. 1 illustrates an example environment in which a node (e.g., a network server) is configured to monitor the individual health of a plurality of accelerator modules configured on the node and to implement autonomous power cycle control of individual accelerator modules based on the monitored health.

FIG. 1 illustrates an example environment in which a node 102, such as a network server configured in a cloud platform, is configured with a management controller 104 that monitors the individual health of a plurality of accelerator modules 106(1-N) (where N=8 in the example of FIG. 1) configured on the node 102. The accelerator modules 106(1-N) may alternatively be referred to as co-processors. Examples of an accelerator module include a graphics processing unit (GPU) and a networking accelerator.

As shown, the plurality of accelerator modules 106(1-N) are coupled to one or more central processing units (CPUs) 108(1-N) or processing cores (where N=2 in the example of FIG. 1). The CPUs 108(1-N) are instructed, by an operating system 110, to execute applications 112 and/or virtual resources 114 (e.g., virtual machines, containers) stored in memory 116. To enhance the execution of the applications 112 and/or virtual resources 114, a CPU 108(1) may be associated with multiple accelerator modules 106(1-4). The CPUs 108(1-N), accelerator modules 106(1-N), and management controller 104 are mounted on a printed circuit board 118 of the node 102.

The management controller 104 is dedicated to monitoring the health of accelerator modules. The management controller 104 may be referred to as an Accelerator Management Controller (AMC). The management controller, or AMC, may be implemented via a Baseboard Management Controller (BMC), a discrete module, or another type of management module. For example, a BMC is a service processor that is capable of monitoring the physical state of the device memory and other hardware/firmware components (e.g., accelerator modules 106(1-N) such as graphics processing units (GPUs) or networking accelerators) using sensors and/or other mechanisms. The BMC is configured on the printed circuit board 118 of the node 102 (e.g., a Universal Baseboard, a Motherboard) and can implement communications associated with the monitoring via a shared or a dedicated network interface card (NIC).

To this end, the management controller 104 is configured with logic to implement health monitoring per accelerator module 120 and power cycling per accelerator module 122 (e.g., at the level of individual accelerator modules). As captured by reference 124 and the dashed lines between the individual accelerator modules 106(1-N) and the management controller 104, the management controller 104 is configured to receive signals indicative of the health of individual accelerator modules 106(1-N) configured on the node 102 and to send signals to power cycle (e.g., reboot, reset) individual accelerator modules 106(1-N).

More specifically, FIG. 1 illustrates an error 126 that impacts accelerator module 106(1). As described above, the error 126 can be associated with a kernel panic, hang state, a periodic interrupt miss, which can be caused by extreme thermal temperature conditions of the accelerator module 106(1) and/or non-functional voltage regulation of the accelerator module 106(1). Previously, when the node 102 detected the error 126, the entire node 102 would go through a power cycle event thereby interrupting the applications 112 and/or virtual resources 114 executing on all the CPUs 1-8(1-N) and all the accelerator modules 106(1-N). However, via the use of the management controller 104, a signal to power cycle can be sent to the accelerator module 106(1), and thus, only the accelerator module 106(1) needs to be power cycled 128 (e.g., the other accelerator modules 106 (2-N) configured on the same node that are not impacted by the error 126 are not power cycled). Consequently, the management controller is configured to implement autonomous power cycle control of individual accelerator modules 106(1-N) based on the monitored health.

Figure 2:
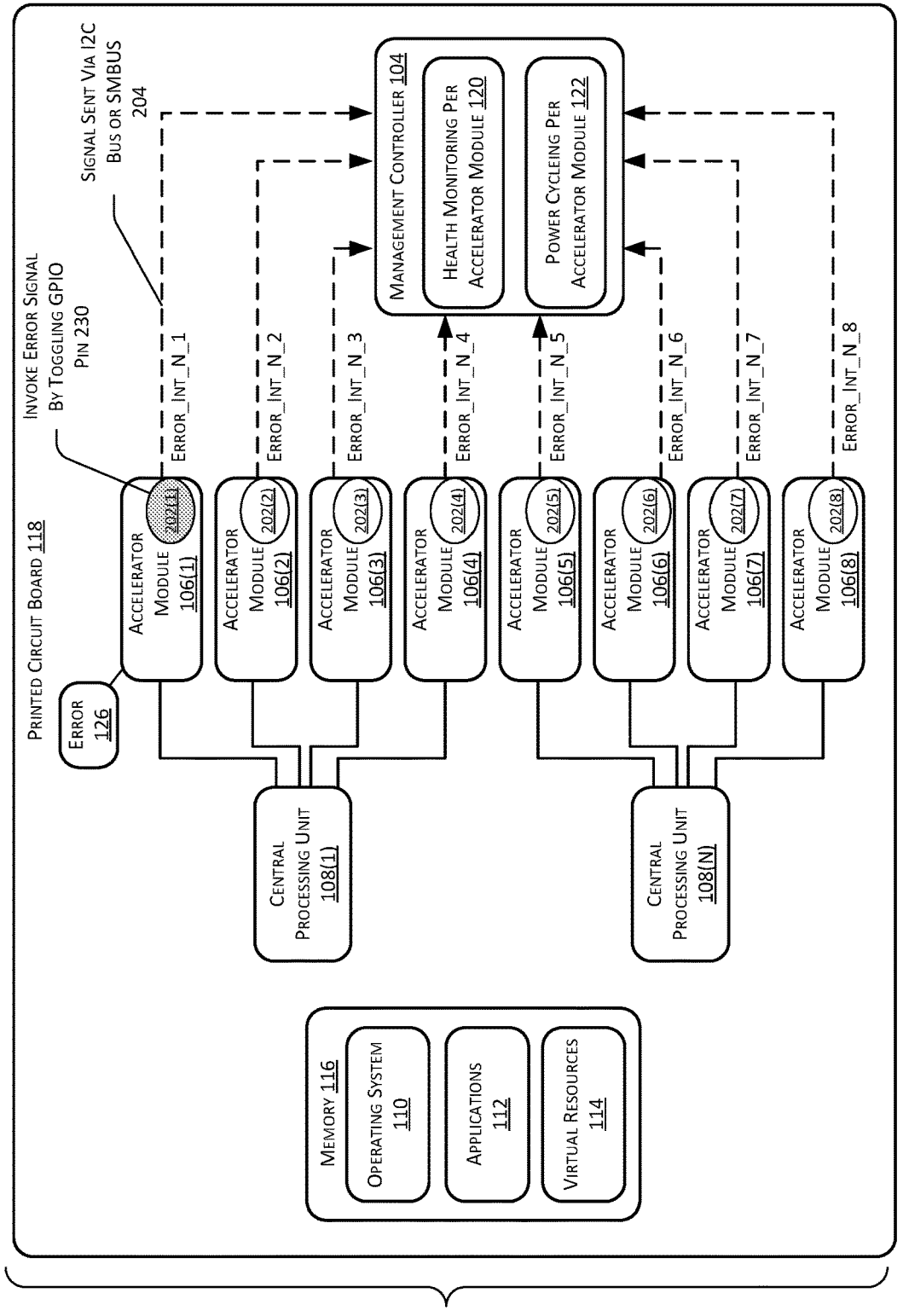
FIG. 2 illustrates the example environment of FIG. 1, in which error signaling on per accelerator module is enabled over an I2C bus or a system management bus via the toggling of a dedicated of a General-Purpose Input-Output (GPIO) pin.

FIG. 2 illustrates the example environment of FIG. 1, in which error signaling on per accelerator module is enabled over an I2C bus or a system management bus via the toggling of a dedicated of a General-Purpose Input-Output (GPIO) pin. Alternatively, the accelerator module can indicate an error state over a serial mechanism, an in band mechanism, or an out of band mechanism available to the accelerator module and the management controller 104.

As shown in FIG. 2, each of the accelerator modules 106(1-8) (e.g., N from FIG. 1 is equal to eight in FIG. 2) includes a corresponding GPIO pin 202(1-8). The GPIO pins 202(1-8) are dedicated to signaling errors to the management controller 104 via an I2C bus or a system management bus 204 (SMBUS). An error is signaled by toggling the GPIO pins 202(1-8) from a normal operating state to an error state.

Consequently, when GPIO pin 202(1) is toggled, an "Error_Int_N_1" signal is sent to the management controller 104 over the I2C bus or the SMBUS. The "1" in the "Error_Int_N_1" signal identifies accelerator module 106 (1). Similarly, when GPIO pin 202(2) is toggled, an "Error_Int_N_2" signal is sent to the management controller 104 over the I2C bus or the SMBUS. The "2" in the "Error_Int_N_2" signal identifies accelerator module 106(2). When GPIO pin 202(3) is toggled, an "Error_Int_N_3" signal is sent to the management controller 104 over the I2C bus or the SMBUS. The "3" in the "Error_Int_N_3" signal identifies accelerator module 106(3). When GPIO pin 202 (4) is toggled, an "Error_Int_N_4" signal is sent to the management controller 104 over the I2C bus or the SMBUS. The "4" in the "Error_Int_N_4" signal identifies accelerator module 106(4). When GPIO pin 202(5) is toggled, an "Error_Int_N_5" signal is sent to the management controller 104 over the I2C bus or the SMBUS. The "5" in the "Error_Int_N_5" signal identifies accelerator module 106 (5). When GPIO pin 202(6) is toggled, an "Error_Int_N_6" signal is sent to the management controller 104 over the I2C bus or the SMBUS. The "6" in the "Error_Int_N_6" signal identifies accelerator module 106(6). When GPIO pin 202 (7) is toggled, an "Error_Int_N_7" signal is sent to the management controller 104 over the I2C bus or the SMBUS. The "7" in the "Error_Int_N_7" signal identifies accelerator module 106(7). Finally, when GPIO pin 202(8) is toggled, an "Error_Int_N_8" signal is sent to the management controller 104 over the I2C bus or the SMBUS. The "8" in the "Error_Int_N_8" signal identifies accelerator module 106(8) (again N=8 for the accelerator modules in the example of FIG. 2).

Accordingly, each accelerator module 106(1-8) in FIG. 2 is configured to generate and send a separate signal to the management controller 104 if it is impacted by an error, and the signal identifies the accelerator module impacted by the error. In the context of FIGS. 1 and 2, accelerator module 106(1) is impacted by error 126. The other accelerator modules 106(2-8) are not impacted by errors. Accordingly, the error signal is invoked for accelerator module 106(1) by toggling GPIO pin 202(1), as captured by element 230 and the shading of GPIO pin 202(1). In contrast, FIG. 2 illustrates that error signals are not invoked for accelerator modules 106(2-8) by the toggling of GPIO pins 202(2-8).

Figure 3:
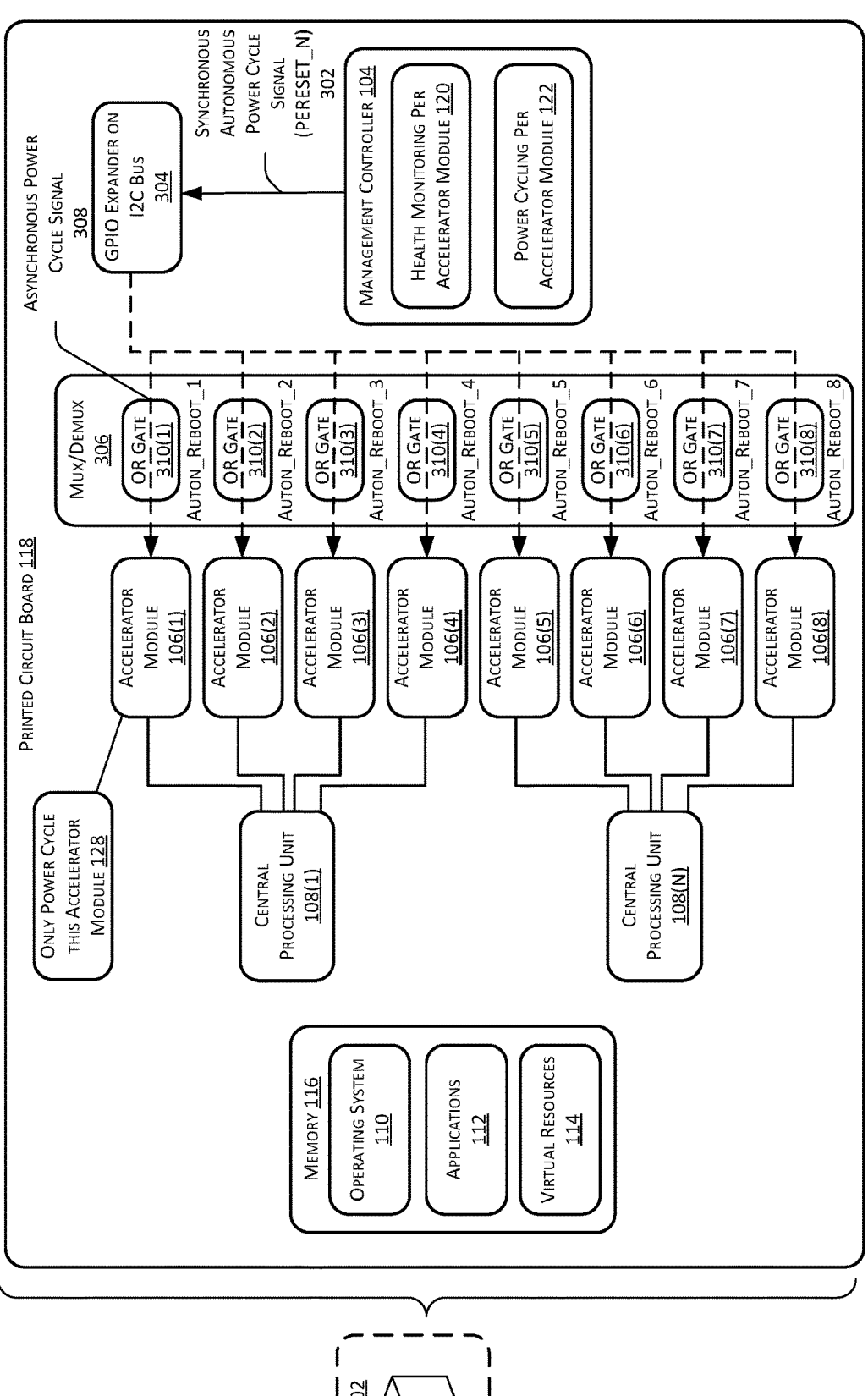
FIG. 3 illustrates the example environment of FIGS. 1 and 2, in which power cycle signaling on per accelerator module is enabled over an I2C bus via switching mechanisms of a multiplexer/demultiplexer (e.g., OR gates associated with the accelerator modules).

FIG. 3 illustrates the example environment of FIGS. 1 and 2, in which power cycle signaling on per accelerator module is enabled over an I2C bus via switching mechanisms of a multiplexer/demultiplexer. As described above, the management controller 104 is configured to receive a signal that indicates the error 126 impacting an identifiable accelerator module 106(1). In response, the management controller 104 is configured to send a signal to power cycle the identifiable accelerator module 106(1) without power cycling other accelerator modules 106(2-8) configured on the same node.

To do this, the management controller 104 sends a synchronous autonomous power cycle signal 302 to a GPIO expander 304 configured on the I2C bus. The synchronous autonomous power cycle signal 302 appears the same as the conventional "PERESET_N" signal used to power cycle the entire node 102 and all the accelerator modules in accordance with PCIe requirements. However, instead of power cycling all the accelerator modules based on the synchronous autonomous power cycle signal 302, the management controller 104 instructs the GPIO expander 304 to use the switching mechanisms of a multiplexer/demultiplexer 306 to generate and send an asynchronous power cycle signal 308 only to the accelerator module 106(1) impacted by the error 126. In other words, the asynchronous power cycle signal 308 is not sent to the other accelerator modules 106(2-8) that are not impacted by the error 126. As shown, the asynchronous power cycle signal 308 may be captured by "AUTON_POWER_CYCLE_1", where the 1 identifies the accelerator module 106(1) that needs to be power cycled.

The multiplexer/demultiplexer 306 includes a series of OR gates 310(1-8) respectively associated with the accelerator modules 106(1-8). The switching of the OR gates 310(1-8) by the management controller 104 enable separate asynchronous power cycle signals to be sent to the accelerator modules 106(1-8). The asynchronous power cycle signal, via the switching of one of the OR gates 310(1-8), causes a power supply to an associated accelerator module 106(1-8) to be disconnected and then reconnected after a short period of time, without disconnecting power to the other accelerator modules or the node 102. Accordingly, switching OR gate 310(1) enables the asynchronous power cycle signal 308 to reach accelerator module 106(1), thereby causing the power supply to accelerator module 106(1) to be disconnected and then reconnected after a short period of time. Similarly, switching the OR gates 310(2-8) enables the separate asynchronous power cycle signals (e.g., "AUTON-_POWER_CYCLE_#) to respectively reach accelerator module 106(2-8), thereby causing the power supply to accelerator modules 106(2-8) to be disconnected and then reconnected after a short period of time, in the event of an error.

Consequently, via the use of the switching mechanisms of the multiplexer/demultiplexer (e.g., OR gates 310(1-8) respectively associated with the accelerator modules 106(1-8)), the management controller 104 can control the power supply to all the accelerator modules configured on a node on a per accelerator module basis and without disconnecting power to the entire node. In various examples, before initiating the power cycle event described above, the management controller 104 may initiate communications, over the system management bus, with the accelerator module 106(1) that signaled the error 126 to confirm that the accelerator module 106(1) is in fact in an error state (e.g., kernel panic or hang state).

Via the use of the management controller 104 described herein, accelerator modules (e.g., accelerator module 106 (2-N) in the example of FIG. 1) that are not impacted by an error continue to function normally and seamlessly. In turn, the effect of the error on applications 112 and/or virtual resources 114 is limited to one or a small number of cloud tenants (i.e., the error does not affect all the cloud tenants executing applications and/or virtual resources on the node 102). Consequently, the productivity associated with the node 102, or a cluster of nodes to which the node 102 belongs, remains at an acceptable level and the Annual Interruption Rate (AIR) remains low (e.g., does not unnecessarily increase).

Figure 4:
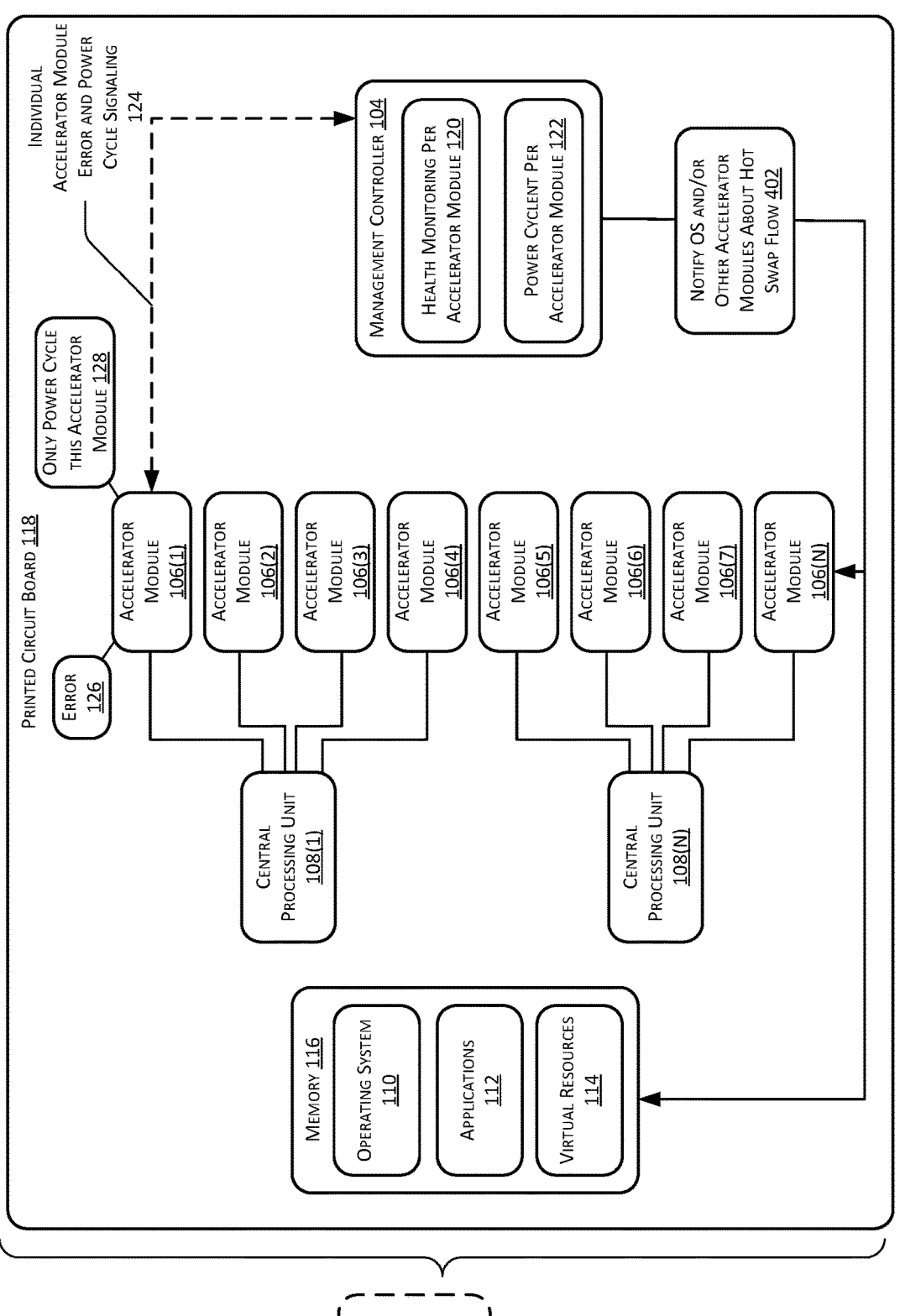
FIG. 4 illustrates the example environment of FIGS. 1-3, in which the management controller notifies, via emulating an attention button press over the system management bus, the operating system and/or other accelerator modules not impacted by the error that a hot swap flow for the accelerator module impacted by the error is being performed.

FIG. 4 illustrates the example environment of FIG. 1, in which the management controller 104 notifies 402, e.g., via emulating an attention button press over the system management bus, the operating system 110 and/or other accelerator modules 106(2-N) not impacted by the error 126 that a hot swap flow for the accelerator module 106(1) impacted by the error 126 is being performed. This notification identifies the accelerator module 106(1) impacted by the error 126 and ensures that the operating system 110, CPUs 108(1-N), and/or other accelerator modules 106(2-N) not impacted by the error 126 do not send traffic or interact with the accelerator module 106(1) impacted by the error 126.

FIG. 5 represents an example process implemented in accordance with various examples from the description of FIGS. 1-4. The order in which the operations are described is not intended to be construed as a limitation, and any number of the described operations can be combined in any order and/or in parallel to implement each process. Moreover, the operations in FIG. 5 can be implemented in hardware, software, and/or a combination thereof. In the context of software, the operations represent computer-executable instructions that, when executed by one or more processing units, cause the one or more processing units to perform the recited operations. For example, modules and other components described herein can be stored in a computer-readable storage media and executed by at least one processing unit to perform the described operations.

FIG. 5 illustrates a flow diagram of an example method 500 for monitoring a health of an individual accelerator module of a plurality of accelerator modules configured on a node.

At operation 502, the management controller receives a first signal that identifies an individual accelerator module of a plurality of accelerator modules configured on a node.

At operation 504, the management controller determines that the first signal indicates an error impacting the individual accelerator module.

At operation 506, in response to determining that the first signal indicates the error impacting the individual accelerator module, the management controller sends a second signal to power cycle the individual accelerator module without power cycling other accelerator modules of the plurality of accelerator modules. As described above, the second signal can be sent to a General-Purpose Input-Output expander on an I2C bus.

At operation 508, the management controller instructs the General-Purpose Input-Output expander to generate and send an asynchronous power cycle signal to the individual accelerator module, and not the other accelerator modules, via a switched OR gate of a multiplexer/demultiplexer.

Figure 6:
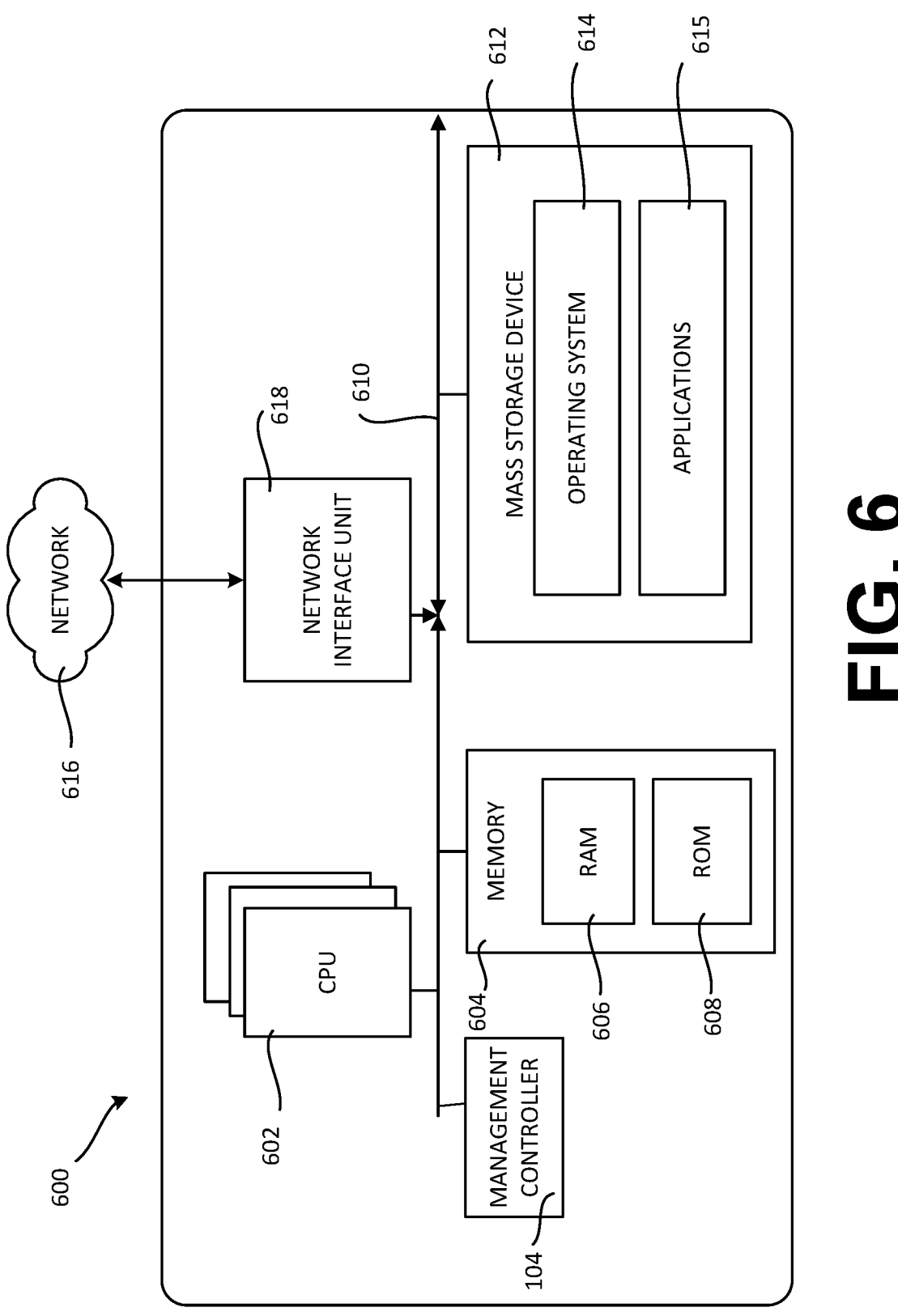
FIG. 6 is an example computer architecture diagram illustrating an illustrative computer hardware and software architecture for a computing system capable of implementing aspects of the techniques and technologies presented herein.

FIG. 6 is a computer architecture diagram showing an illustrative computer hardware and software architecture for a computing device that can implement the various technologies presented herein. In particular, the architecture illustrated in FIG. 6 can be utilized to implement the node 102 in FIGS. 1-4.

The computing device 600 illustrated in FIG. 6 includes a central processing unit 602 ("CPU"), a system memory 604, including a random-access memory 606 ("RAM") and a read-only memory ("ROM") 608, and a system bus 610 that couples the memory 604 to the CPU 602. A basic input/output system ("BIOS" or "firmware") containing the basic routines that help to transfer information between elements within the computing device 600, such as during startup, can be stored in the ROM 608. The computing device 600 further includes a mass storage device 612 for storing an operating system 614, applications 615, and/or other types of programs.

The mass storage device 612 is connected to the CPU 602 through a mass storage controller connected to the bus 610. The mass storage device 612 and its associated computer readable media provide non-volatile storage for the computing device 600. Although the description of computer readable media contained herein refers to a mass storage device, such as a hard disk, CD-ROM drive, DVD-ROM drive, or USB storage key, it should be appreciated by those skilled in the art that computer readable media can be any available computer storage media or communication media that can be accessed by the computing device 600.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of any of the above should also be included within the scope of computer readable media.

By way of example, and not limitation, computer storage media can include volatile and non-volatile, removable and non-removable media implemented in any method or technology for storage of information such as computer readable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computing device 600. For purposes of the claims, the phrase "computer storage medium," and variations thereof, does not include waves or signals per se or communication media.

According to various configurations, the computing device 600 can operate in a networked environment using logical connections to remote computers through a network such as the network 616. The computing device 600 can connect to the network 616 through a network interface unit 618 connected to the bus 610. It should be appreciated that the network interface unit 618 can also be utilized to connect to other types of networks and remote computer systems.

It should be appreciated that the software components described herein, when loaded into the CPU 602 and executed, can transform the CPU 602 and the overall computing device 600 from a general-purpose computing device into a special-purpose computing device customized to facilitate the functionality presented herein. The CPU 602 can be constructed from any number of transistors or other discrete circuit elements, which can individually or collectively assume any number of states. More specifically, the CPU 602 can operate as a finite-state machine, in response to executable instructions contained within the software modules disclosed herein. These computer-executable instructions can transform the CPU 602 by specifying how the CPU 602 transitions between states, thereby transforming the transistors or other discrete hardware elements constituting the CPU 602. FIG. 6 further illustrates that the management controller 104 is also connected to the bus 610.

The disclosure presented herein also encompasses the subject matter set forth in the following clauses.

Example Clause A, a method implemented by a management controller configured to monitor a health of an individual accelerator module of a plurality of accelerator modules configured on a node, comprising: receiving a first signal that identifies the individual accelerator module; determining that the first signal indicates an error impacting the individual accelerator module; in response to determining that the first signal indicates the error impacting the individual accelerator module, sending a second signal to power cycle the individual accelerator module without power cycling other accelerator modules of the plurality of accelerator modules to a General-Purpose Input-Output expander on an I2C bus; and instructing the General-Purpose Input-Output expander to generate and send an asynchronous power cycle signal to the individual accelerator module, and not the other accelerator modules, via a switched OR gate of a multiplexer/demultiplexer Example Clause B, the method of Example Clause A, wherein determining that the signal indicates the error impacting the individual accelerator module is based on the signal being received from a General-Purpose Input-Output pin of the individual accelerator module that is dedicated to error signaling for power cycling purposes.

Example Clause C, the method of Example Clause A or Example Clause B, wherein the switched OR gate disconnects a power supply to the individual accelerator module and then reconnects the power supply to the individual accelerator module without disconnecting power to the other accelerator modules or the node.

Example Clause D, the method of any one of Example Clauses A through C, further comprising informing, via a system management bus, an operating system and the other accelerator modules of the error impacting the individual accelerator module to ensure that the operating system and the other accelerator modules do not send traffic to or interact with the individual accelerator module.

Example Clause E, a baseboard management controller configured to monitor a health of an individual accelerator module of a plurality of accelerator modules configured on a node by performing operations comprising: receiving a first signal that identifies the individual accelerator module; determining that the first signal indicates an error impacting the individual accelerator module; and in response to determining that the first signal indicates the error impacting the individual accelerator module, sending a second signal to power cycle the individual accelerator module without power cycling other accelerator modules of the plurality of accelerator modules.

Example Clause F, the baseboard management controller of Example Clause E, wherein determining that the signal indicates the error impacting the individual accelerator module is based on the signal being received from a General-Purpose Input-Output pin of the individual accelerator module that is dedicated to error signaling for power cycling purposes.

Example Clause G, the baseboard management controller of Example Clause E or Example Clause F, wherein: the second signal is sent to a General-Purpose Input-Output expander on an I2C bus; and the operations further comprise instructing the General-Purpose Input-Output expander to generate and send an asynchronous power cycle signal to the individual accelerator module, and not the other accelerator modules, via a switched OR gate of a multiplexer/demultiplexer.

Example Clause H, the baseboard management controller of Example Clause G, wherein the switched OR gate disconnects a power supply to the individual accelerator module and then reconnects the power supply to the individual accelerator module without disconnecting power to the other accelerator modules or the node.

Example Clause I, the baseboard management controller of any one of Example Clauses E through H, wherein the first signal is received via a system management bus or an I2C bus.

Example Clause J, the baseboard management controller of any one of Example Clauses E through I, wherein the operations further comprise informing, via a system management bus, an operating system and the other accelerator modules of the error impacting the individual accelerator module to ensure that the operating system and the other accelerator modules do not send traffic to or interact with the individual accelerator module.

Example Clause K, the baseboard management controller of any one of Example Clauses E through J, wherein: the node comprises a plurality of central processing units; and each central processing unit of the plurality of central processing units is coupled to multiple accelerator modules via a printed circuit board.

Example Clause L, a method implemented by a management controller configured to monitor a health of an individual accelerator module of a plurality of accelerator modules configured on a node, comprising: receiving a first signal that identifies the individual accelerator module; determining that the first signal indicates an error impacting the individual accelerator module; and in response to determining that the first signal indicates the error impacting the individual accelerator module, sending a second signal to power cycle the individual accelerator module without power cycling other accelerator modules of the plurality of accelerator modules.

Example Clause M, the method of Example Clause L, wherein determining that the signal indicates the error impacting the individual accelerator module is based on the signal being received from a General-Purpose Input-Output pin of the individual accelerator module that is dedicated to error signaling for power cycling purposes.

Example Clause N, the method of Example Clause L or Example Clause M, wherein: the second signal is sent to a General-Purpose Input-Output expander on an I2C bus; and the method further comprises instructing the General-Purpose Input-Output expander to generate and send an asynchronous power cycle signal to the individual accelerator module, and not the other accelerator modules, via a switched OR gate of a multiplexer/demultiplexer.

Example Clause O, the method of Example Clause N, wherein the switched OR gate disconnects a power supply to the individual accelerator module and then reconnects the power supply to the individual accelerator module without disconnecting power to the other accelerator modules or the node.

Example Clause P, the method of any one of Example Clauses L through O, wherein the first signal is received via a system management bus or an I2C bus.

Example Clause Q, the method of any one of Example Clauses L through P, further comprising informing, via a system management bus, an operating system and the other accelerator modules of the error impacting the individual accelerator module to ensure that the operating system and the other accelerator modules do not send traffic to or interact with the individual accelerator module.

Example Clause R, the method of any one of Example Clauses L through Q, wherein the management controller comprises a baseboard management controller configured on a printed circuit board along with the plurality of accelerator modules.

Example Clause S, the method of any one of Example Clauses L through R, wherein the plurality of accelerator modules comprises a plurality of graphical processing units.

Example Clause T, the method of any one of Example Clauses L through S, wherein: the node comprises a plurality of central processing units; and each central processing unit of the plurality of central processing units is coupled to multiple accelerator modules via a printed circuit board.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

The terms "a," "an," "the" and similar referents used in the context of describing the invention (especially in the context of the following claims) are to be construed to cover both the singular and the plural unless otherwise indicated herein or clearly contradicted by context. The terms "based on," "based upon," and similar referents are to be construed as meaning "based at least in part" which includes being "based in part" and "based in whole" unless otherwise indicated or clearly contradicted by context.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different signals).

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter. All examples are provided for illustrative purposes and is not to be construed as limiting.

What is claimed is:

1. A method implemented by a management controller configured to monitor a health of an individual accelerator module of a plurality of accelerator modules configured on a node and to power cycle the individual accelerator module, the method comprising:

receiving a first signal that identifies the individual accelerator module;

determining that the first signal indicates an error impacting the individual accelerator module;

in response to determining that the first signal indicates the error impacting the individual accelerator module, sending, via an I2C bus that connects the management controller and the individual accelerator module, a second signal to power cycle the individual accelerator module without power cycling other accelerator modules of the plurality of accelerator modules to a General-Purpose Input-Output expander; and instructing the General-Purpose Input-Output expander to generate and send an asynchronous power cycle signal to the individual accelerator module, and not the other accelerator modules, via a switched OR gate of a multiplexer/demultiplexer.

2. The method of claim 1, wherein determining that the first signal indicates the error impacting the individual accelerator module is based on the first signal being received from a General-Purpose Input-Output pin of the individual accelerator module that is dedicated to error signaling for power cycling purposes.

3. The method of claim 1, wherein the switched OR gate disconnects a power supply to the individual accelerator module and then reconnects the power supply to the individual accelerator module without disconnecting power to the other accelerator modules or the node.

4. The method of claim 1, further comprising informing, via a system management bus, an operating system and the other accelerator modules of the error impacting the individual accelerator module to ensure that the operating system and the other accelerator modules do not send traffic to or interact with the individual accelerator module.

5. A baseboard management controller configured to monitor a health of an individual accelerator module of a plurality of accelerator modules configured on a node and to power cycle the individual accelerator module by performing operations comprising:

receiving a first signal that identifies the individual accelerator module;

determining that the first signal indicates an error impacting the individual accelerator module; and in response to determining that the first signal indicates the error impacting the individual accelerator module, sending, via a bus that connects the baseboard management controller and the individual accelerator module, a second signal to power cycle the individual accelerator module without power cycling other accelerator modules of the plurality of accelerator modules.

6. The baseboard management controller of claim 5, wherein determining that the first signal indicates the error impacting the individual accelerator module is based on the first signal being received from a General-Purpose Input-Output pin of the individual accelerator module that is dedicated to error signaling for power cycling purposes.

7. The baseboard management controller of claim 5, wherein:

the second signal is sent to a General-Purpose Input-Output expander on an I2C bus; and the operations further comprise instructing the General-Purpose Input-Output expander to generate and send an asynchronous power cycle signal to the individual accelerator module, and not the other accelerator modules, via a switched OR gate of a multiplexer/demultiplexer.

8. The baseboard management controller of claim 7, wherein the switched OR gate disconnects a power supply to the individual accelerator module and then reconnects the power supply to the individual accelerator module without disconnecting power to the other accelerator modules or the node.

9. The baseboard management controller of claim 5, wherein the first signal is received via a system management bus or an I2C bus.

10. The baseboard management controller of claim 5, wherein the operations further comprise informing, via a system management bus, an operating system and the other accelerator modules of the error impacting the individual accelerator module to ensure that the operating system and the other accelerator modules do not send traffic to or interact with the individual accelerator module.

11. The baseboard management controller of claim 5, wherein:

the node comprises a plurality of central processing units; and each central processing unit of the plurality of central processing units is coupled to multiple accelerator modules via a printed circuit board.

12. A method implemented by a management controller configured to monitor a health of an individual accelerator module of a plurality of accelerator modules configured on a node and to power cycle the individual accelerator module, the method comprising:

receiving a first signal that identifies the individual accelerator module;

determining that the first signal indicates an error impacting the individual accelerator module; and in response to determining that the first signal indicates the error impacting the individual accelerator module, sending, via a bus that connects the management controller and the individual accelerator module, a second signal to power cycle the individual accelerator module without power cycling other accelerator modules of the plurality of accelerator modules.

13. The method of claim 12, wherein determining that the first signal indicates the error impacting the individual accelerator module is based on the first signal being received from a General-Purpose Input-Output pin of the individual accelerator module that is dedicated to error signaling for power cycling purposes.

14. The method of claim 12, wherein:

the second signal is sent to a General-Purpose Input-Output expander on an I2C bus; and the method further comprises instructing the General-Purpose Input-Output expander to generate and send an asynchronous power cycle signal to the individual accelerator module, and not the other accelerator modules, via a switched OR gate of a multiplexer/demultiplexer.

15. The method of claim 14, wherein the switched OR gate disconnects a power supply to the individual accelerator module and then reconnects the power supply to the individual accelerator module without disconnecting power to the other accelerator modules or the node.

16. The method of claim 12, wherein the first signal is received via a system management bus or an I2C bus.

17. The method of claim 12, further comprising informing, via a system management bus, an operating system and the other accelerator modules of the error impacting the individual accelerator module to ensure that the operating system and the other accelerator modules do not send traffic to or interact with the individual accelerator module.

18. The method of claim 12, wherein the management controller comprises a baseboard management controller configured on a printed circuit board along with the plurality of accelerator modules.

19. The method of claim 12, wherein the plurality of accelerator modules comprises a plurality of graphical processing units.

20. The method of claim 12, wherein:

the node comprises a plurality of central processing units; and each central processing unit of the plurality of central processing units is coupled to multiple accelerator modules via a printed circuit board.

* * * * *